(12) United States Patent
Tiruvallur et al.

(10) Patent No.: US 7,596,653 B2
(45) Date of Patent: Sep. 29, 2009

(54) TECHNIQUE FOR BROADCASTING MESSAGES ON A POINT-TO-POINT INTERCONNECT

(75) Inventors: Keshavan K. Tiruvallur, Tigard, OR (US); Kenneth C. Creta, Gig Harbor, WA (US); Robert G. Blankenship, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/984,527

(22) Filed: Nov. 8, 2004

(65) Prior Publication Data

US 2006/0101183 A1 May 11, 2006

(51) Int. Cl.
*G06F 13/00* (2006.01)
*G06F 1/00* (2006.01)

(52) U.S. Cl. .................. 710/317; 713/324; 713/340

(58) Field of Classification Search ............... 710/317; 713/340, 324; 370/253, 255; 709/245
See application file for complete search history.

(56) References Cited

U.S. PATENT DOCUMENTS

| | | | | |
|---|---|---|---|---|
| 5,355,371 A * | 10/1994 | Auerbach et al. | ........... | 370/255 |
| 5,572,678 A * | 11/1996 | Homma et al. | ............. | 709/227 |
| 5,822,519 A * | 10/1998 | Watanabe | .................. | 709/220 |
| 5,982,775 A * | 11/1999 | Brunner et al. | ............ | 370/401 |
| 6,009,488 A | 12/1999 | Kavipurapu | | |
| 6,067,567 A * | 5/2000 | Bartfai et al. | ............... | 709/221 |
| 6,122,277 A * | 9/2000 | Garmire et al. | ............. | 370/390 |
| 6,343,319 B1 * | 1/2002 | Abensour et al. | ........... | 709/219 |
| 6,374,303 B1 * | 4/2002 | Armitage et al. | ............ | 709/242 |
| 6,466,552 B1 * | 10/2002 | Haumont | ..................... | 370/310 |
| 6,728,771 B2 * | 4/2004 | Stumer | ....................... | 709/227 |
| 6,751,697 B1 | 6/2004 | Shima et al. | | |
| 6,968,176 B2 * | 11/2005 | Juzswik | ...................... | 455/411 |
| 7,095,739 B2 * | 8/2006 | Mamillapalli et al. | ....... | 370/390 |
| 7,333,486 B2 * | 2/2008 | Novaes | ........................ | 370/390 |
| 2002/0193073 A1 * | 12/2002 | Fujioka | ....................... | 455/41 |
| 2004/0064509 A1 * | 4/2004 | Ayyagari et al. | ............ | 709/205 |
| 2004/0240458 A1 * | 12/2004 | T V et al. | ..................... | 370/412 |
| 2005/0054353 A1 * | 3/2005 | Mademann | .................. | 455/458 |
| 2005/0216812 A1 * | 9/2005 | Leon et al. | ................... | 714/748 |
| 2005/0262215 A1 * | 11/2005 | Kirov et al. | .................. | 709/207 |
| 2005/0276415 A1 * | 12/2005 | Brett et al. | ................... | 380/201 |
| 2006/0018271 A1 * | 1/2006 | Alex et al. | ................... | 370/328 |
| 2006/0031557 A1 * | 2/2006 | Walsh et al. | ................. | 709/232 |
| 2006/0141988 A1 * | 6/2006 | Wendling | ................. | 455/412.1 |

FOREIGN PATENT DOCUMENTS

| | | |
|---|---|---|
| DE | 102 15 990 A1 | 10/2003 |
| EP | 0 420 493 B1 | 4/1991 |
| EP | 0 749 225 B1 | 12/1996 |

* cited by examiner

*Primary Examiner*—Khanh Dang
*Assistant Examiner*—Christopher A Daley
(74) *Attorney, Agent, or Firm*—Caven & Aghevli LLC

(57) ABSTRACT

A technique to broadcast a message across a point-to-point network. More particularly, embodiments of the invention relate to broadcasting messages between electronics components within a point-to-point interconnect.

19 Claims, 4 Drawing Sheets

TECHNIQUE FOR BROADCASTING MESSAGES ON A POINT-TO-POINT INTERCONNECT

FIELD

Embodiments of the invention relate to electronic networks. More particularly, embodiments of the invention relate to broadcasting information across an electronics network across a point-to-point interconnect.

BACKGROUND

Prior art techniques of broadcasting messages of information within a network of electronics elements, such as a computer system, typically involve electronics elements, such as semiconductor devices, that reside on a common bus, or "shared" bus. In shared bus architectures, information may be shared by each agent residing on the bus by placing the data on the bus and assigning an address to the information that all agents on the bus will recognize. In other shared bus systems, other techniques for broadcasting information may be used, but in most shared bus systems, data is broadcast to the various bus agents via the bus upon which all agents reside, either directly or through coupling logic.

FIG. 1 illustrates a prior art shared bus system, wherein broadcast data broadcast across the bus is shared with all other agents residing on the bus. In the example illustrated in FIG. 1, there are no intermediate bus agents through which the broadcast data must pass in order to be sent to not only the intermediate agent, but all agents connected to the intermediate agent, and so on.

FIG. 2, on the other hand, illustrates a typical computer system in which bus agents, including processors, are connected via a point-to-point interconnect. FIG. 2 illustrates a number of bus agents residing on a number of different buses. Typically, each agent may be a transmitter and a receiver of information by assigning a particular address to each agent to which data being sent across a bus corresponds. Because the bus agents illustrated in FIG. 2 do not all reside on a shared bus, however, broadcast data cannot simply be placed on the bus of the transmitting agent and detected by each agent within the system.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention relate to electronic networks. More particularly, embodiments of the invention relate to broadcasting messages between electronics components within a point-to-point interconnect.

Point-to-point interconnected networks typically use dedicated bus traces, or "lanes", to which bus agents within the network correspond. This allows, not only for greater network performance between network agents residing on a common bus ("link"), but similar network performance between agents residing on different links. In an embodiment of the invention, in which agents are interconnected via the same link, for example, a broadcast message may be sent to all agents within the network by merely sending the message across all links shared by an initiating agent and all target agents.

Figure 1:
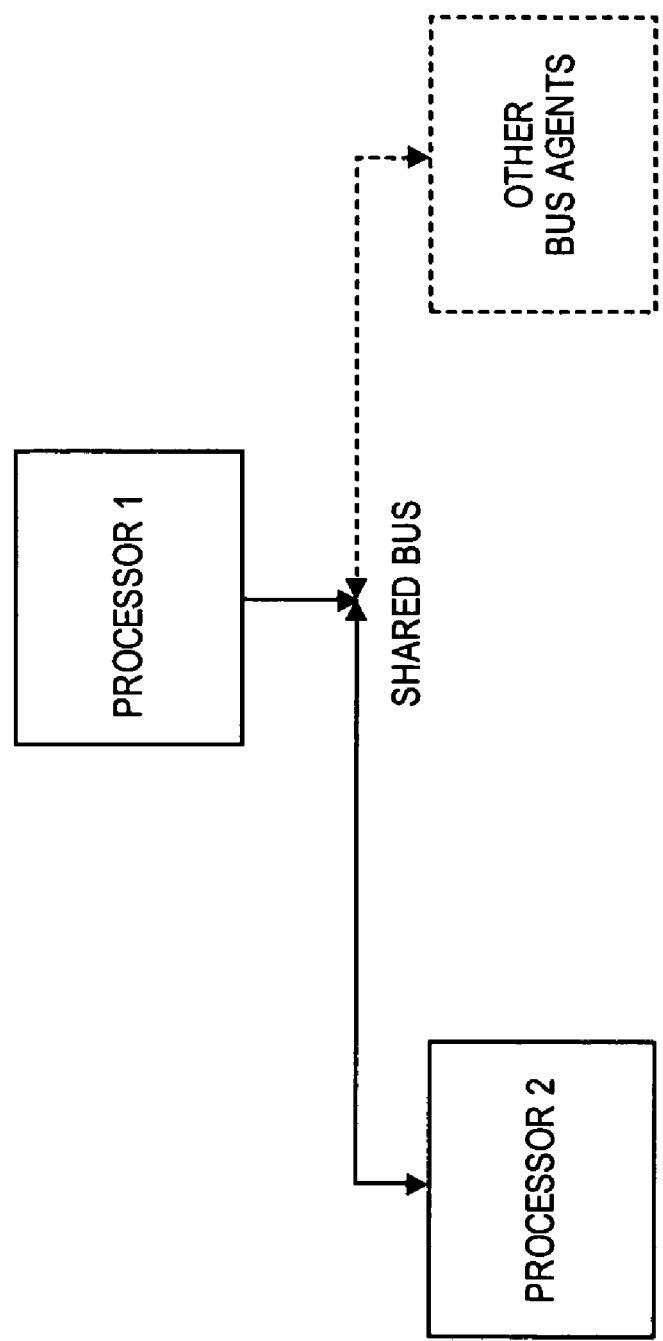
FIG. 1 illustrates a prior art electronics network in which network agents reside on a common, or "shared" bus.
Figure 2:
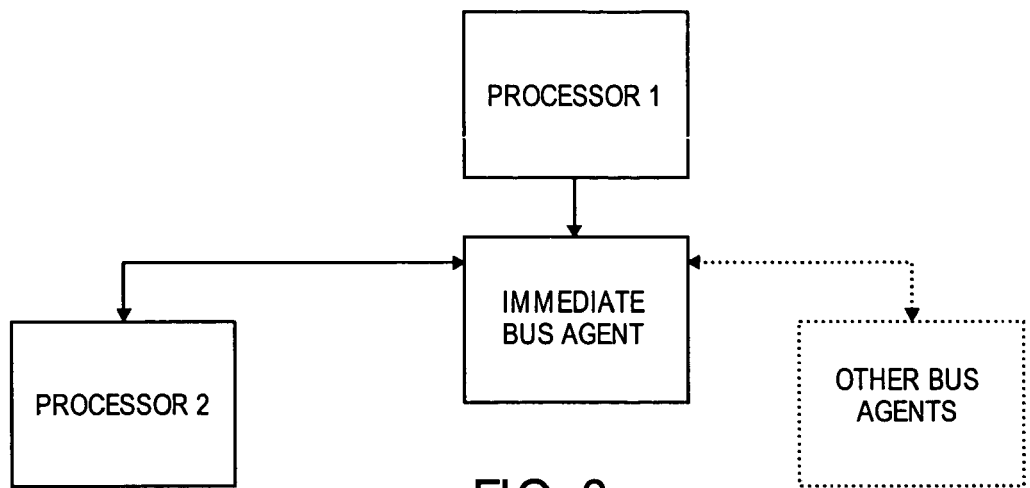
FIG. 2 illustrates a prior art electronics network in which network agents reside on multiple buses via a point-to-point interconnect.
Figure 3:
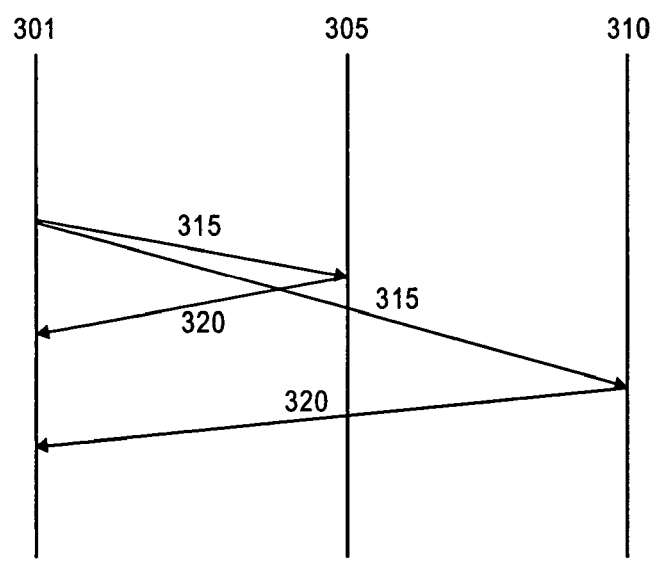
FIG. 3 illustrates a fully connected electronics network in which a broadcast message may be sent, according to one embodiment of the invention.

FIG. 3 illustrates a fully connected point-to-point network, in which at least one embodiment may be used. In particular, FIG. 3 illustrates, at least conceptually, an initiating processor 301, a target processor 305, and a target input/output ("I/O") controller hub 310. In order to broadcast a message to the target processor and the target I/O controller hub, the initiating processor may send the message 315 on the link from the initiating processor to the target processor and the link from the initiating processor to the target I/O controller hub along with a signal to indicate that each agent is an intended recipient of the message and should accordingly acknowledge 320 that they in fact have received the message.

In order to facilitate the interconnection of multiple agents residing on multiple links, however, the agents themselves typically act as both a transmitter ("initiator") and as a receiver ("target") of data placed on the link. Messages addressed to a particular agent within a point-to-point network may be transmitted by one agent residing on a first link, to another agent residing on a second link by each agent helping to route the message to the intended target agent. For example, in one embodiment, each agent may access a routing table to determine which next target agent the message should be sent to in order to ensure the message ultimately reaches it's intended target. The routing table may help to facilitate the shortest route, for example, to get the message from the initiating agent to the intended target.

In order for an initiating agent to broadcast a message to all or multiple bus agents within the point-to-point network, however, the message must not merely pass through an optimally short path through the network, but rather the message must be sent to each agent within the network. In one embodiment of the invention, the message is sent from an initiating agent along with a signal or address that indicates to each agent that the agent must relay the message to each agent with which it shares a link. Furthermore, in at least one embodiment, this is accomplished by assigning an address to a broadcast message that each agent within network may interpret as corresponding to a broadcast message and respond accordingly.

In other embodiments, the broadcast message may be of a certain message type that each agent interprets as being associated with a broadcast message. Yet, in other embodiments, the broadcast message may be associated with a signal, such as an interrupt signal, that other agents may interpret as being associated with a broadcast message and therefore respond accordingly.

Figure 4:
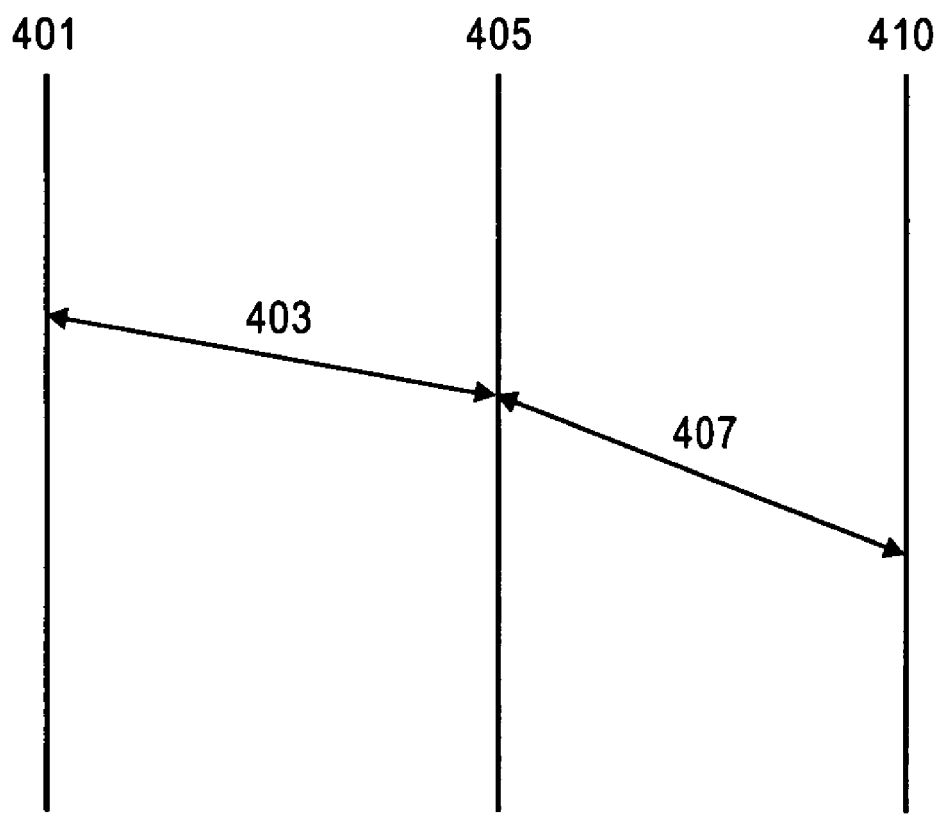
FIG. 4 illustrates a partially connected electronics network in which a broadcast message may be sent, according to one embodiment of the invention.

FIG. 4 illustrates a partially connected point-to-point network in which at least one embodiment of the invention may be used. In the network of FIG. 4, a first processor 401 sends a broadcast message by sending the message to a second processor 405 with which it shares a link 403. The second processor will then transmit the message to an I/O hub 410 that is within a link 407 of the second processor. In the partially connected configuration of FIG. 4, each agent (e.g., processors and I/O hub) act both as an initiator, when sending the message, and as a target, when receiving the message.

By each agent within the network of FIG. 4 acting both as an initiator and as a target, a broadcast message can traverse the network and reach each intended recipient of the message within the network. Likewise, each agent in the network of FIG. 4, may send an acknowledgement back to the initiating agent and the agent from which the message was received via the same link in which the message was transmitted. Furthermore, each agent may wait to send an acknowledgement until it has received all acknowledgements, or some group of acknowledgements, from other agents for which it was an initiating agent.

The principles described in regard to the partially connected point-to-point network of FIG. 4 may be extended as the network scales in size. For example, the message may be sent by an initiating agent to each agent within a network with whom the initiating agent shares a link. Likewise, the recipient agents may act as initiators themselves and relay the message onto each agent within the network with which they share a link.

In order to facilitate the broadcast of a message to each agent within a point-to-point network, such as the one illustrated in FIG. 4, the target agent(s) must recognize the message as corresponding to a broadcast message so that the agent(s) will pass the message onto agents which each shares a link. Furthermore, each target agent must know where to relay the message as an initiator agent once the message is received. In one embodiment of the invention, receiving agents recognize the message as being a broadcast message by interpreting the message type.

For example, in FIG. 4, the message type ("identifier") is a special transaction associated with a common system interface (CSI) protocol implemented within the point-to-point network, that acts as an interrupt to the target agents. Specifically, the first processor sends a packet of information to the second processor containing not only the data that is to be broadcast to the target agent(s), but also identity information that each target agent recognizes as an interrupt. Likewise, the second processor sends the data as well as the identifier to the I/O hub.

The identifier associated with each broadcast message within the partially connected point-to-point network of FIG. 4 and the fully connected point-to-point network of FIG. 3 is an interrupt, "SpecintPhysical" that acts as an interrupt to the processors and I/O agent. The SpecIntPhysical is an interrupt associated with a particular CSI implementation. Furthermore, the SpecIntPhysical identifier differentiates the interrupt from other types of message types by associating with a particular address that each agent within the network is able to interpret as corresponding to a broadcast message. In other embodiments, the interrupt may be associated with other addresses that each agent may interpret as corresponding to a broadcast message.

Furthermore, in other embodiments, the identifier may not be an interrupt, but rather a signal that specifies a target agent within a list of targets agents. Within the networks of FIG. 3 and FIG. 4, the SpcIntPhysical identifier may be associated with target agents that are processors, in one embodiments. Therefore, the message would be broadcast to all target agents being identified as a processor within the point-to-point network.

Regardless of how the targets of the broadcast message are identified, each agent transmits the broadcast message, in at least one embodiment according to a look-up table identifying all agents with which an initiating agent shares a link. The broadcast message is thereby broadcast across each link described in each initiating agent's look-up table with which the initiating agent shares a link. This may then be-repeated until the broadcast message reaches all agents, including intermediate targets, within the network.

For example, in one embodiment illustrated in FIG. 4, the second processor relays the broadcast message onto the I/O hub, because the I/O hub is listed within a look-up table that the second processor can access and determine that it shares a link with the I/O hub. Accordingly, if the second processor shared a link with another agent, the look-up table would indicate this as well and the broadcast message would be sent to that agent as well.

In the embodiments illustrates in FIG. 3 and FIG. 4, a signal indicating that the broadcast message has been received is sent from each target agent to the initiating agent from which it received the broadcast message. Only after each initiating agent has received a signal from all agents it broadcasted the message to indicating the broadcast message has been received, will the initiating agent send a "complete" signal to the agent from which it received the broadcast message.

In FIG. 3, the first processor receives "cmp" 320 signals from the second processor and the I/O hub indicating that the broadcast message has been received to the first processor and the I/O hub. The situation is a bit more complex in the case of a partially connected point-to-point network, such as the one illustrated in FIG. 4. In FIG. 4, the second processor will only send a "cmp" signal to the first processor to indicate the completion of the broadcast message after the second processor has received a "cmp" 420 signal from the I/O hub. Similarly, if several agents were connected to the second processor, the second processor would only send a "cmp" signal back to the first processor after it had received all "cmp" signals from all targets to which it sent the broadcast message.

Within the context of a CSI-based point-to-point network, in which the communication fabric is organized into functional layers, communication between network agents, such as the processors and I/O hub of FIGS. 3 and 4, is done using packets of information.

In other embodiments of the invention, other packet types may be used to communicate the broadcast message. Alternatively, other embodiments may use communication formats other than packets, such as dedicated bus signals, or an encoded signal within a larger data stream.

Figure 5:
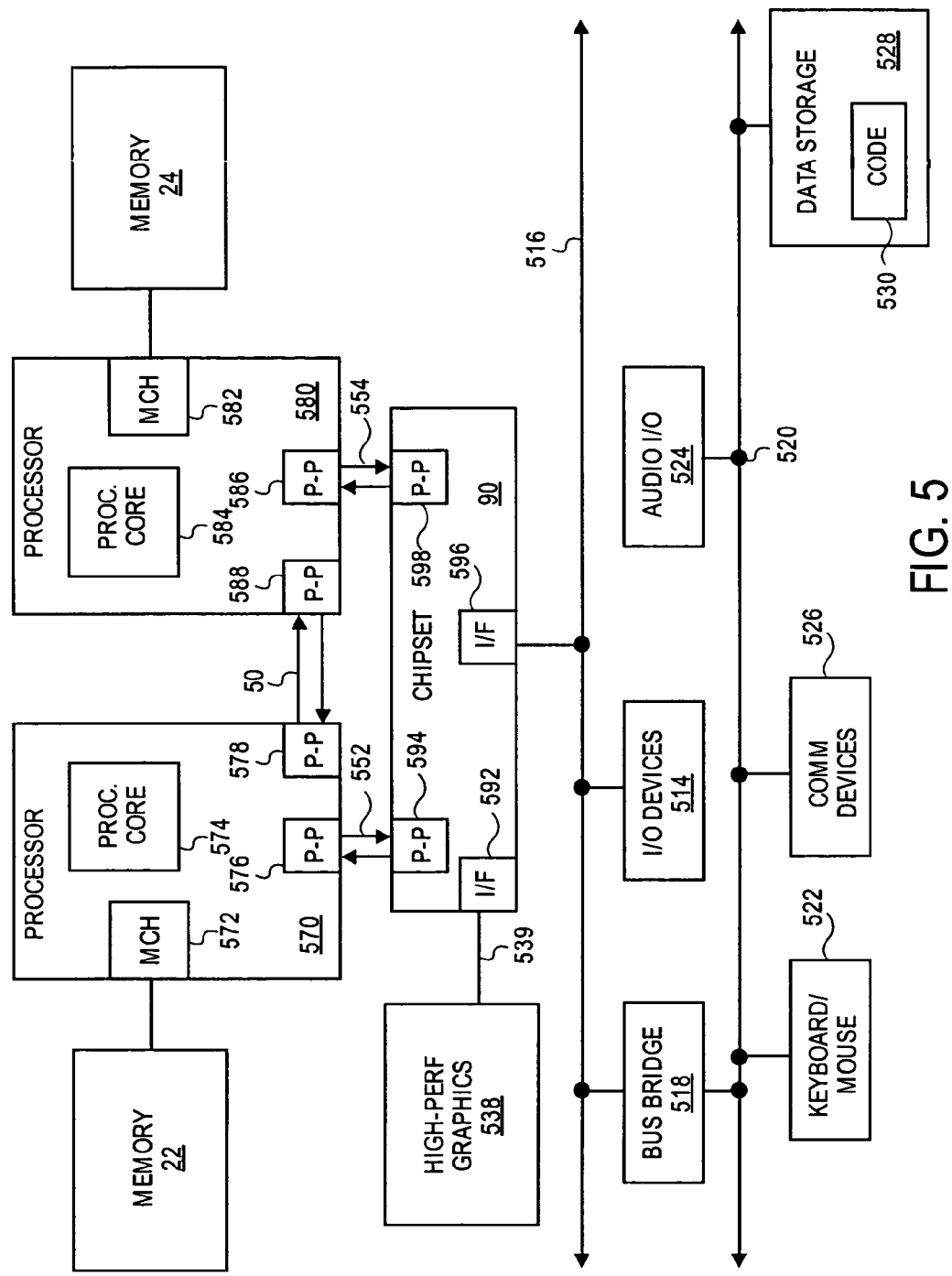
FIG. 5 illustrates a computer system in which one embodiment of the invention may be used.

FIG. 5 illustrates a network of electronic elements in which at least one embodiment of the invention may be used. Specifically, FIG. 5 illustrates a computer system that is arranged in a point-to-point (PtP) configuration. In particular, FIG. 5 shows a system where processors, memory, and input/output (I/O) devices are interconnected by a number of point-to-point interfaces.

The FIG. 5 system may also include several processors, of which only two, processors 570, 580 are shown for clarity. Processors 570, 580 may each include a local memory controller hub (MCH) 572, 582 to connect with memory 52, 54. Processors 570, 580 may exchange data via a point-to-point interface 550 using point-to-point interface circuits 578, 588. Processors 570, 580 may each exchange data with a chipset 590 via individual point-to-point interfaces 552, 554 using point to point interface circuits 576, 594, 586, 598. Chipset 590 may also exchange data with a high-performance graphics circuit 538 via a high-performance graphics interface 592.

At least one embodiment of the invention may be located within the memory controller hub 572 or 582 of the processors. Other embodiments of the invention, however, may exist in other circuits, logic units, or devices within the system of FIG. 5. Furthermore, other embodiments of the invention may be distributed throughout several circuits, logic units, or devices illustrated in FIG. 5.

Embodiments of the invention described herein may be implemented with circuits using complementary metal-oxide-semiconductor devices, or "hardware", or using a set of instructions stored in a medium that when executed by a machine, such as a processor, perform operations associated with embodiments of the invention, or "software". Alternatively, embodiments of the invention may be implemented using a combination of hardware and software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. A system comprising:
    a plurality of links to couple a plurality of bus agents;
    a first bus agent connecting to a first link of the plurality of links to initiate a broadcast message to one or more bus agents connecting to the first link; and
    a second bus agent connecting to the first link to receive the broadcast message and to initiate the broadcast message to one or more bus agents connecting with the second bus agent via one or more links other than the first link, the second bus agent signaling to the first bus agent that the broadcast message has been received after the second bus agent has received a signal from each bus agent to which the second agent sent the broadcast message indicating that each bus agent has received the broadcast message, wherein the second bus agent is to send a signal to the first bus agent to indicate that the broadcast message has been received after the second bus agent has received a signal from all bus agents to which the second agent has sent the broadcast message indicating that each bus agent has received the broadcast message.

2. The system of claim 1 wherein the second bus agent decodes the broadcast message and determines that the broadcast message is to be broadcast to all bus agents in the system before initiating the broadcast message to one or more bus agents connecting with the second bus agent.

3. The system of claim 1 wherein the first and second bus agents are within a partially connected point-to-point network.

4. The system of claim 1 wherein the broadcast message is to be sent to the second bus agent in parallel with the one or more bus agents.

5. The system of claim 4 wherein each of the second bus agent and the one or more bus agents are to signal the first bus agent whether they have received the broadcast message.

6. The system of claim 1 wherein the first, second, and one or more bus agents are to communicate via a common system interface protocol.

7. The system of claim 6 wherein the broadcast message is a non-coherent bypass message within the common system interface protocol.

8. The system of claim 6 wherein the first bus agent is a processor and the second bus agent is an input/output hub device.

9. The system of claim 6 wherein the first bus agent is a processor and the second target bus agent is a processor.

10. The system of claim 1 wherein the broadcast message comprises a signal to interrupt a bus agent that receives the broadcast message.

11. The system of claim 1 wherein a bus agent maintains a look-up table to store addresses of all bus agents with which the bus agent shares a link.

12. The system of claim 1, further comprising a routing table corresponding to the second agent, wherein the second agent is to access the routing table to determine to which next target agent the broadcast message is to be sent.

13. A method comprising:
    transmitting a broadcast message by an initiating bus agent to a plurality of bus agents within a point-to-point (PtP) network, the PtP network comprising a plurality of links to couple the initiating bus agent and the plurality of bus agents;
    receiving the broadcast message and determining whether the message is intended to be used by one or more of the plurality of bus agents, by a receiving bus agent among the plurality of bus agents;
    transferring by the receiving bus agent the received broadcast message to the one or more intended bus agents within a broadcast dependency list; and
    sending by the receiving bus agent an acknowledgement signal indicating that broadcast message has been received to the initiating bus agent after the receiving bus agent has received a signal from all bus agents to which the receiving agent sent the broadcast message indicating that each bus agent has received the broadcast message.

14. The method of claim 13 wherein the broadcast message is a non-coherent bypass message within a common system interface protocol.

15. The method of claim 14 wherein the broadcast message comprises a signal to interrupt a bus agent that receives the broadcast message.

16. The method of claim 15 wherein the PtP network is fully connected and the broadcast message is sent to the plurality of bus agents in parallel.

17. The method of claim 15 wherein the PtP network is partially connected and the broadcast message is sent to some of the plurality of bus agents in parallel and to some of the plurality of bus agents in series.

18. The method claim 15 wherein the plurality of bus agents comprise a processor and an input/output controller hub.

19. The method of claim 13, further comprising:
    accessing a routing table corresponding to the second agent; and
    determining to which next target agent the broadcast message is to be sent based on data stored in the routing table.

* * * * *